Aug. 7, 1951  R. V. STAFFORD  2,563,560
LINE ENGAGING ATTACHMENT FOR FISHING FLOATS
Filed March 3, 1950
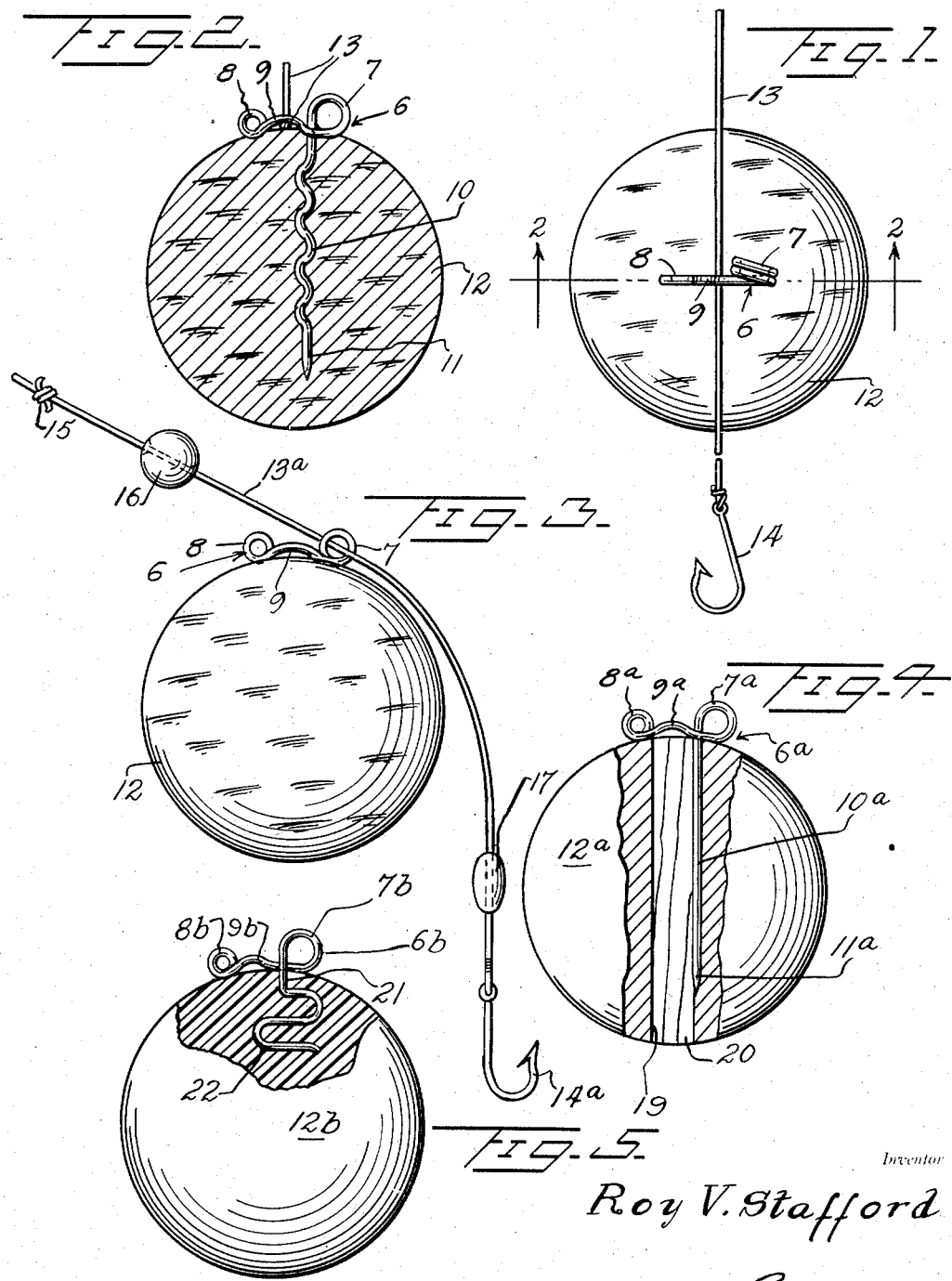
Inventor
Roy V. Stafford
By John N. Randolph
Attorney Patented Aug. 7, 1951

2,563,560

UNITED STATES PATENT OFFICE 2,563,560

LINE ENGAGING ATTACHMENT FOR FISHING FLOATS

Roy V. Stafford, Black Mountain, N. C.

Application March 3, 1950, Serial No. 147,518

6 Claims. (Cl. 43—44.92)

1

This invention relates to a novel construction of line engaging attachment which is adapted to be anchored to a fishing float for connecting a fishing line thereto either for sliding movement relatively to the float or for clamping the line non-slidably to the float.

More particularly, it is an aim of the present invention to provide a line engaging attachment of extremely simple construction capable of being readily engaged with or disengaged from a fishing line and which may be utilized for supporting a fishhook at a predetermined distance from the float or for slidably connecting a float to a fishing line when employed for casting.

Various other objects and advantages of the invention will hereinafter become more fully apparent from the following description of the drawing, illustrating preferred embodiments thereof, and wherein:

Figure 1 is a plan view illustrating one form of the invention applied to a fishing float and showing a fishing line anchored by the line engaging member to the float;

Figure 2 is a sectional view thereof taken substantially along a plane as indicated by the line 2—2 of Figure 1;

Figure 3 is a side elevational view illustrating another manner of utilizing the invention;

Figure 4 is a side elevational view, partly in vertical section illustrating a slightly modified form of the line engaging member for use with a different type of fishing float, and Figure 5 is a side elevational view, partly in section of a plastic fishing float and illustrating still another embodiment of the line engaging member for use therewith.

Referring more specifically to the drawing and first with reference to the embodiment of the invention as illustrated in Figures 1, 2 and 3, the fish line holding attachment comprising the invention and as illustrated in these views is designated generally 6 and is formed from a single strand of resilient wire which is preferably of stainless steel or rust resistant and which wire strand in cross section may be round, oblong, semi-round or flat. An intermediate portion of the strand forming the attachment 6 is bent to provide a loop or eye 7 which may be composed of two convolutions, as illustrated, or of a single convolution. One end of the strand extends from the bottom of the loop or eye 7 and terminates in an upwardly turned back terminal portion forming a small eye 8. The strand portion between the line receiving eye 7 and the smaller terminal eye 8 is bowed upwardly to provide the arcuate

2 clamping portion 9. The other, longer end of the strand forming the line engaging attachment 6 extends from the opposite end of the line guiding eye 7 at substantially a right angle to the first mentioned end and includes a sinuous portion 10 which terminates in a substantially straight tapered piercing point 11.

Said sinuous end 10 is adapted to be imbedded and anchored in a float, as for example a spherical fishing float 12 formed of cork, as illustrated, or which may be formed of wood. The piercing end 11 is forced into the float 12 to a sufficient depth to imbed the sinuous portion 10 in the float body up to the line guiding eye 7, as illustrated in Figures 2 and 3 and the undulating shape of the end portion 10 will obviously anchor the line engaging attachment 6 in the float body 12 so that the line guiding eye 7 and the terminal eye 8 will be in contact with portions of the periphery of the float 12 while the arcuate portion 9 will be spaced slightly from the periphery of the float. If it is desired to anchor a fishing line 13 to the float 12 at a desired distance from a fishhook 14 which is connected to one end of the line 13, so that the hook 14 may be supported at a predetermined level below the surface of a body of water, the line 13, at a desired distance from the hook 14, is forcibly drawn between the terminal eye 8 and the adjacent surface portion of the float 12 for positioning said line portion beneath the arcuate portion 9 to be clamped thereby to the float 12. In accomplishing this operation, if desired the eye 8 may be grasped as a handle and drawn away from the surface of the float 12 and it will be readily apparent that the convolutions of the line engaging eye 7 will act as a spring to permit accomplishment of this operation and will also function as a spring for urging the attachment portions 8 and 9 toward the float 12 so that the line 13 will be clamped between the surface of the float 12 and the arcuate clamping portion 9.

Likewise, if desired, the line engaging attachment 6 may be utilized as illustrated in Figure 3 for slidably connecting a fishing line 13a to the float 12 whereby the float is to be used with the line for casting. For this connection, the line 13a is passed through the guide eye 7 and a separate piece of line is knotted as seen at 15 around the line 13a above the edge to frictionally engage the line but so that the knot 15 can be moved to any desired point above the fishhook 14a. A bead 16 is slidably mounted on the line 13a between the knot 15, which forms a stop, and the guide eye 7. A sinker 17 is clamped to the line 13a below the eye 7 and adjacent the hook 14a. The bead 16 and sinker 17 are each larger than the opening of the eye 7 so that the line 13a can slide downwardly through the eye 7 or from left to right of Figure 3 until the bead 16 engages the eye 7 and is engaged by the knot 15, or the line 13a may slide upwardly through the guide eye 7 until the sinker 17 engages the eye 7. Likewise, by merely passing a portion of the line 13a under the terminal eye 8, the line 13a may be anchored to the float at any desired distance from the hook 14a.

Figure 4 illustrates a slightly modified form of the line engaging attachment designated 6a for use with a float 12a which may be formed of any suitable buoyant material and which is of the type having a bore 19 extending therethrough and which normally receives a stem or spindle, not shown, and which is removed when the line engaging attachment 6a is utilized. The line engaging attachment 6a includes a line engaging eye 7a, corresponding to the line engaging eye 7, a terminal eye 8a, corresponding to the terminal eye 8 and an arcuate clamping portion 9a corresponding to the clamping portion 9, which parts are disposed in the same relative positions as the parts 7, 8 and 9 with respect to a surface portion of the float 12a. In lieu of the sinuous strand portion 10, the strand forming the attachment 6a is provided with a substantially straight shank portion 10a which preferably terminates in a tapered end or terminal 11a. The shank portion 10a is inserted into the bore 19 together with a plug 20 by which the shank 10a is clamped against a portion of the wall of the bore 19 for supporting the attachment 6a in the position as illustrated in Figure 4. As thus disposed, the attachment 6a may be utilized with a fishing line, not shown in Figure 4, either in the manner as illustrated in Figures 1 and 2 or in the manner as illustrated in Figure 3.

Figure 5 illustrates a third form of line engaging attachment, designated generally 6b, likewise formed from a single strand of wire corresponding to the strand from which the line engaging attachments 6 and 6a are formed and which includes the portions 7b, 8b and 9b, corresponding to the portions 7, 8 and 9, respectively, and which are disposed in the same relationship as said portions to the surface of a float 12b. The float 12b is formed from plastic or other pre-cast, buoyant material. The other end of the attachment 6b instead of being sinuous as seen at 10 or straight as seen at 10a is provided with a relatively short straight portion 21 which extends into the float body 12b and a longer terminal portion 22 which is lapped and thus anchored in the float body. The portions 21 and 22 are molded or cast into the float 12b when it is formed for permanently anchoring the attachment 6b thereto. Obviously, said attachment 6b may be utilized in the same manner as the attachment 6 as illustrated in either Figure 1 or Figure 3.

The line engaging attachments 6, 6a and 6b may be employed with floats of different shapes and may be made in different sizes. Various other modifications and changes are likewise contemplated and may obviously be resorted to, without departing from the spirit or scope of the invention as hereinafter defined by the appended claims.

I claim as my invention:

1. A line engaging attachment comprising, in combination with a fishing float, a strand of resilient wire provided with a line guiding eye intermediate of its ends, one end of said strand extending laterally from the line guiding eye and terminating in a smaller, terminal eye, the portion of the strand between the line guiding eye and terminal eye being arcuately bowed to provide a line clamping portion, the opposite end of said strand extending from the line guiding eye at substantially a right angle to the first mentioned strand end and being adapted to be imbedded in and anchored to the float body for positioning the line guiding eye and terminal eye with portions of the convolutions thereof in contact with the surface of the float and in substantially upstanding positions with respect thereto, said clamping portion being spaced slightly from the surface of the float for detachably clamping a portion of a fishing line between said clamping portion and the float.

2. A line engaging attachment as in claim 1, said line guiding eye providing a spring coil for spring biasing said arcuate clamping portion toward the float.

3. A line engaging attachment as in claim 1, said line guiding eye having a plurality of convolutions forming a spring biasing said arcuate clamping portion toward the float.

4. A line engaging attachment as in claim 1, said last mentioned strand end including a substantially straight tapered terminal portion for piercing the float body and a sinuous shank portion disposed between the terminal portion and line guiding eye to anchor the attachment to the float.

5. A line engaging attachment as in claim 1, said last mentioned strand end comprising an elongated substantially straight shank portion adapted to be wedged by a clamping plug in a bore of the float.

6. A line engaging attachment as in claim 1, said last mentioned strand end comprising a relatively long lapped portion adapted to be imbedded in the body of the float and having a substantially straight end portion, disposed at an angle to the lapped portion which projects outwardly of the body and merges with one end of said line guiding eye.

ROY V. STAFFORD.

REFERENCES CITED

The following references are of record in the file of this patent:

UNITED STATES PATENTS

| Number | Name | Date |
|---|---|---|
| 615,078 | Lubbock | Nov. 29, 1898 |
| 878,362 | Denning | Feb. 4, 1908 |
| 1,575,216 | Kuehn et al. | Mar. 2, 1926 |
| 2,183,818 | Minser | Dec. 19, 1939 |
| 2,225,214 | Goertzen | Dec. 17, 1940 |